United States Patent
Lee et al.

(10) Patent No.: US 8,679,700 B2
(45) Date of Patent: Mar. 25, 2014

(54) CO-CO$_2$ ENERGY CONVERSION CYCLE USING SOLID OXIDE FUEL CELLS

(75) Inventors: Maw-Chwain Lee, Taoyuan County (TW); Chun-Hsiu Wang, Taoyuan County (TW); Yang-Chuang Chang, Taoyuan County (TW); Wei-Xin Kao, Taoyuan County (TW); Tai-Nan Lin, Taoyuan County (TW); Jen-Chen Chang, Taoyuan County (TW); Rung-Je Yang, Taoyuan County (TW); Lin-Song Lee, Taoyuan County (TW)

(73) Assignee: Institute of Nuclear Energy Research Atomic Energy Council, Executive Yuan, Taoyuan (TW)

( * ) Notice: Subject to any disclaimer, the term of this patent is extended or adjusted under 35 U.S.C. 154(b) by 590 days.

(21) Appl. No.: 12/973,507

(22) Filed: Dec. 20, 2010

(65) Prior Publication Data

US 2012/0115067 A1    May 10, 2012

(30) Foreign Application Priority Data

Nov. 9, 2010   (TW) ................................ 99138558 A (51) Int. Cl.
    *H01M 8/18*    (2006.01)

(52) U.S. Cl.
    USPC .......................................................... 429/495

(58) Field of Classification Search
    None
    See application file for complete search history.

(56) References Cited

U.S. PATENT DOCUMENTS

2002/0194782 A1*  12/2002  Paisley ..................... 48/197 FM

\* cited by examiner

*Primary Examiner* — Patrick Ryan
*Assistant Examiner* — Wyatt McConnell
(74) *Attorney, Agent, or Firm* — Morris Manning & Martin LLP; Tim Tingkang Xia, Esq.

(57) ABSTRACT

A method and apparatus for energy conversion cycle based on Solid Oxide Fuel Cell (SOFC) and utilizing CO$_2$ source (referred to as SOFC-CO$_2$-ECC) adopt CO$_2$ as energy sources from waste/stock gas or convert and fix it in the useful compounds. CO$_2$ is converted into CO and O$_2$ via simultaneously catalytic and electrochemical reactions in SOFC for power generation and CO$_2$ cracking. Furthermore, CO is used either as the fuel in SOFC for power generation or starting materials in the chemical reactors to produce CO-derivatives of energy source materials and useful chemical compounds. Hence, SOFC-CO$_2$-ECC is an active or scientific carbon cycle with zero emission of CO$_2$.

11 Claims, 11 Drawing Sheets

A Menbrane Electrode Assembly(MEA)-SOFC is disposed at a cell test station(for example,ProboStat Unit) and platinum wires are respectively attached to a cathode and an anode of the MEA. A golden ring is melted at about 1053°C and closes a cathode of MEA or cell and an alumina tube end of the cell test station,to isolate a cathode reaction chamber and a anode reaction chamber to an oxygen tight grade.The platinum wiires of the cathode and the anode are respectively attached to,for example,a ProboStat-[solartron-SI-1287 (Electrochemical Interface)/1267(Impedance/Gain-Phase Analyzer)system,for cell performance data collection ,including potential current/power density(V-I-P)vs. time relation and temperature-related data recording] — 30

The cell test station is disposed in a high-temperature oven,and heated to 1053° C at a temperature raising rate of 1°C/min (generally lower than 3° C/min),while $N_2$ is introduced to the anode to serve as a leakage testing gas when the cathode reaction chamber and the anode reaction chambers are sealed with the goldem end of the MEA are isolated, and no communication and leakage of gas occur — 31

$H_2$ is introduced to the anode end to reduce anode NiO into Ni,and air is introduced to the cathode at the same time. It is tested whether an open circuit voltage (OCV) reaches 1.0V or above (at 800°C) ,to confirm whether the structure of the MEA(cell)is complete.Moreover,the V-I-P andthe electical impedance spectrum(EIS) of the test cell are persistently recorded ,to confirm the magnitude of electricity,so as an earlier stage of electricity test of the MEA,$H_2$(anode)/air (cathode) are used as system gas,to verify whether the cell and the system is in good state. — 32

The gas introduced to the anode is ketp unchanged,the gas introduced to the cathode is $CO_2$ instead,and the OCV and the V-I-P,and composition and concentration of reaction products ($CO_2/CO/O_2$)at the cathode are tested and recorded respectively at 840°C,890°C and 938°C.It is confirmed that $CO_2$ may be used as cathode oxidant gas of the first SOFC,suggesting that $CO_2(g) \rightarrow CO(g)+1/2O_2(g)$ is feasible to be performed at the cathode,and $O_2$ may be successfully provided in progression of electorochemical reaction and be used for current generation.The correctness of the system and be used for current generation.The correctness of the system and the feasibility of SOFC-$CO_2$-ECC are confirmed. — 33

After the cell performance test is completed,the gas flow rate is lowered,the anode is maintained in a reduction atmosphere,and coodled to room temperature at a temperaturedrop rate of 1°C/min (generally lower than 3°C/min),and then the fed gases are completely closed.Thus,the main test of system is completed. — 34

The cell performance data is analyzed to identify the feasible achievement of the SOFC-$CO_2$-ECC. — 35

| Temperature (°C) | Open circuit voltage (OCV) (mV) | At maximal power | | | | At Potential = 10 mV | | |
|---|---|---|---|---|---|---|---|---|
| | | Maximal power density (mW/cm²) | Potential (mV) | Current (mA/cm²) | Current (mA/cm²) | Conent at outlet of cathode (mol.%) | | |
| | | | | | | CO₂ | CO | O₂ |
| a | | | | | | | | |
| 840 | 235 | 4.38 | 127 | 34.4 | 71.7 | 95.24 | 4.76 | 0 |
| 890 | 264 | 6.46 | 134 | 48.2 | 83.4 | 95.08 | 4.92 | 0 |
| 938 | 282 | 8.38 | 140 | 59.8 | 89.8 | 95.14 | 4.86 | 0 |
| b | | | | | | | | |
| 938 | 157 | 1.78 | 77 | 23.0 | 39.9 | 72.17 | 27.83 | 0 | a. Flow rate of reactant: $H_2$ (50%) + $N_2$ (50%) : 200 cc/min; $CO_2$ (100%) : 200 cc/min
b. Flow rate of reactant: $H_2$ (50%) + $N_2$ (50%) : 20 cc/min; $CO_2$ (100%) : 20 cc/min

FIG. 8

| Temperature (°C) | Potential (E, mV) | Current (I, mA) | Flow rate of reactant (cc/min) | | Content at outlet of cathode (mol.%) | | | Yield of CO (%) |
|---|---|---|---|---|---|---|---|---|
| | | | H₂/N₂ | CO₂ | CO₂ | CO | O₂ | |
| 840 | 120 | 38.3 | 200 | 200 | 95.41±0.15 | 4.59±0.15 | 0 | 4.59 |
| | 80 | 50.8 | | | 95.31±0.10 | 4.69±0.10 | 0 | 4.69 |
| | 40 | 63.2 | | | 95.19±0.04 | 4.81±0.04 | 0 | 4.81 |
| | 10 | 71.7 | | | 95.24±0.09 | 4.76±0.09 | 0 | 4.76 |
| 890 | 120 | 46.1 | 200 | 200 | 95.27±0.05 | 4.73±0.05 | 0 | 4.73 |
| | 80 | 59.9 | | | 95.22±0.07 | 4.78±0.07 | 0 | 4.78 |
| | 40 | 73.5 | | | 95.14±0.09 | 4.86±0.09 | 0 | 4.86 |
| | 10 | 83.3 | | | 95.08±0.11 | 4.92±0.11 | 0 | 4.92 |
| 938 | 120 | 56.4 | 200 | 200 | 95.33±0.05 | 4.67±0.05 | 0 | 4.67 |
| | 80 | 70.2 | | | 95.26±0.08 | 4.74±0.07 | 0 | 4.74 |
| | 40 | 82.8 | | | 95.21±0.05 | 4.79±0.05 | 0 | 4.79 |
| | 10 | 89.8 | | | 95.14±0.02 | 4.86±0.02 | 0 | 4.86 |
| | 10 | 83.2 | 150 | 150 | 94.13±0.03 | 5.87±0.03 | 0 | 5.87 |
| | | 72.6 | 100 | 100 | 91.85±0.08 | 8.15±0.08 | 0 | 8.15 |
| | | 61.8 | 50 | 50 | 85.19±1.59 | 14.81±1.59 | 0 | 14.81 |
| | | 40.7 | 20 | 20 | 72.17±0.81 | 27.83±0.81 | 0 | 27.83 |

FIG. 9

CO-CO₂ ENERGY CONVERSION CYCLE USING SOLID OXIDE FUEL CELLS

CROSS-REFERENCE TO RELATED APPLICATIONS

This non-provisional application claims priority under 35 U.S.C. §119(a) on Patent Application No(s). 099138558 filed in Taiwan, R.O.C. on Nov. 9, 2010, the entire contents of which are hereby incorporated by reference.

BACKGROUND OF THE INVENTION

1. Field of Invention

The present invention relates to a method and apparatus of $CO$—$CO_2$ energy conversion cycle using solid oxide fuel cells (SOFC-$CO_2$-ECC), in which $CO_2$ is adopted as oxidant source for power generation. An innovative solution is provided, to solve greenhouse effect issue caused by increasing $CO_2$ concentration in the atmosphere. Due to simultaneously high-temperature (700-1000° C.) catalytic and electrochemical reactions in the SOFC, $CO_2$, a compound having extreme chemical stability, is cracked at about 800° C. following a chemical reaction below: $CO_2 \rightarrow CO_{(g)} + \frac{1}{2}O_2$, to generate $CO_{(g)}$ and $O_2$, then $O_2$ electrochemically reacts with $H_2$ (or other hydrocarbons, such as methane) in the SOFC for power generation. As such, $CO_2$ may serve as a power source material in an overall reaction of the SOFC, and converted into a very useful energy source or compound CO, which can be derived into useful compounds or energy source, for example, aldehydes and alcohols, for regeneration of energy source, so as to complete an overall energy conversion carbon cycle of $CO_2 \rightarrow CO \rightarrow$ derivatives of CO (fixation of $CO_2$) $\rightarrow$ generation of energy source $\rightarrow CO_2$, and achieve zero emission of $CO_2$. Technical solutions, auxiliary materials and equipments of the present invention are capable of effectively solving the problem of global extinction of organisms caused by greenhouse effect of $CO_2$.

2. Related Art

The development of human civilization mainly relies on the development of the materials and technologies using energy sources. Among hydrocarbon oxides, coal and petroleum are extensively used due to the advantage of dual purposes of fixed position and mobility, and products after use of coal and petroleum are mainly oxides such as $CO_2$ and $H_2O$, or NOx, SOx, and COx, which are all air pollution gases except $H_2O$. Furthermore, $CO_2$ has high output and is a stable compound, and is only converted and consumed through plant photosynthesis, and thus being persistently remained in the atmosphere. Although $CO_2$ may be prepared into dry ice and serve as gas for secondary enhancement of oil recovery for an oil well, it has few uses. Long-term high output of $CO_2$ leads to sharp increase of $CO_2$ level in the air, and triggers greenhouse effect, global warming, frequent natural disasters, and abnormal climate, and the problem has reached the degree of no time to delay. However, the "energy saving and carbon reduction policy" involves the use of nuclear energy and forest conservation and forestation, and also involves reduction of use of petroleum and coal fuels. However, the current civilization improvement and economic development have to rely on supply of energy sources. In addition to compromise of the two aspects, it is necessary to find a new solution of $CO_2$ problem.

Due to international extensive consumption and use of fossil energy sources, the amount of the product $CO_2$ is continuously increased, and the whole atmosphere of the earth is polluted, and thus resulting in greenhouse effect and threats and risks to living conditions of human being and other related organism on the earth. It is estimated that $CO_2$ content in the atmosphere is continuously exponentially increased to 380 ppm in 2000, and the annual increase rate is gradually accelerated, which may be attributed to man's increasing combustion of fossil fuels. Therefore, the issue of "energy saving and carbon reduction" is raised, to rescue the earth and solve the problem of human survival. In this issue, various processes are set forth to provide a solution for the $CO_2$ problems. It is emphasized in Copenhagen conference (COP-15) that in order to combat global climate change, global carbon emission must be reduced greatly, to control the global temperature rise to be below 2° C. and the global average $CO_2$ concentration in 2050 to be returned to 450 ppm, because among greenhouse gases (water vapor=36-70%; carbon dioxide=9-26%; methane=9%; ozone=3-7%), $CO_2$ is the main cause.

At present, solution of this issue in world is directed to development of the technologies of $CO_2$ capture, storage and, reutilization. It is expected to effectively lower $CO_2$ content in the atmosphere and solve the greenhouse issue through fixed storage or by fixing $CO_2$ through a chemical reaction, such as $CO_2+CaO$, to generate a solid such as $CaCO_3$, so as to extract large volume of $CO_2(g)$ from the atmosphere for solidification.

For the $CO_2$ cracking chemical reaction $CO_2(g) \rightarrow CO(g) + \frac{1}{2}O_2(g)$, a spontaneous reaction temperature is 3001.5° C. according to thermodynamic calculation, and thus the reaction cannot be effectively overcome and implemented by using the current useful technology and apparatus. Therefore, $CO_2$ greenhouse gas cannot be solved, and becoming a problem around the world.

SOFCs have advantages of high energy conversion efficiency, low noise, low environment pollution, high reliability, and diversity of fuel, and have the potential of challenging "internal-combustion engine", and thus being capable of solving the problem of energy shortage in future. Especially, the fossil energy sources are gradually depleted, and replaced by gasified and liquefied coal sources, and thus coal fuel era comes, in which SOFCs are the apparatus of main energy source converter and will play an innovative role in the era. With the successful of performance stability and long-term operation test of SOFCs, technology and functions of apparatus become mature gradually. In the future, distributed or centralized power generators or power plants will gradually replace the existing coal-fired power plants, and thus the economic benefits are very large.

Presently, in an SOFC, $H_2$, natural gas, or a fossil fuel (for example, hydrocarbons such as methane, alcohols, alkanes or alkynes, or even diesel) is fed into an anode as fuel, and $O_2$ in air is fed into a cathode as oxidant, and the chemical energy is directly converted into electric energy via simultaneously or sequentially electrochemical and catalytic chemical reactions. Main products at the anode are $CO_2$ and $H_2O$, and $O_2$ depleted air at the cathode. Therefore, main cause $CO_2$ of greenhouse effect is naturally generated. However, as the energy source conversion rate (up to 70-80%) of the SOFC is much higher than that of a conventional coal-fired power plant (generally about 20-30%), for a certain amount of fuel, the SOFC can achieve a function of energy increase and carbon reduction. This advantage can only lower the emission of $CO_2$, and thus partly achieving the purpose of energy saving and carbon reduction.

At present, solving of the problem of greenhouse effect in world is directed to development of technologies of $CO_2$ capture, storage, and reutilization. However, the development is still at an initial stage, and no specific and effective method is set forth for solving the problem. One process or procedure is provided, in which $CO_2$ is fixed and stored, or converted into a solid through a chemical reaction, such as $CO_2+CaO \rightarrow CaCO_3$, so as to extract large volume of $CO_2(g)$ from the atmosphere for solidification, thereby effectively lowering the $CO_2$ content in the atmosphere. Furthermore, a primitive process in the nature is to plant a lot of forests and seaweed plants, such that chlorophyll photo-synthesis is performed, to convert $CO_2$ into plant ingredients, thereby lowering the $CO_2$ content in the atmosphere. Both the processes are feasible but contradict the increase tendency in energy source demand, have many difficulties, are passive solutions and actions, and belong to natural carbon cycle.

According to the method and apparatus for energy conversion cycle based on SOFC and utilizing $CO_2$ source of the present invention, waste $CO_2$, main cause of greenhouse effect, is converted into energy source materials by an SOFC, by cracking $CO_2$ as SOFC cathode oxidant, in presence of SOFC anode fuel such as $H_2$ following $CO_2 \rightarrow CO_{(g)}+\frac{1}{2}O_2$, CO is generated for power generation. CO is a high-activity compound, and may be used as fuel of the SOFC (in SOFC anode) for power generation with $O_2$ in air at the cathode, to generate electric energy and $CO_2$, thereby "use-regeneration" and power generation ECC of $CO_2$ is completed. Furthermore, CO may react with $H_2$ and $O_2$ to synthesize a stable compound, such as useful solid or liquid compounds of alcohols, aldehydes, and acids, and thus being safely stored in the earth for recycle and reutilization. As a result, the $CO_2$ content in the atmosphere is lowered, and the problem of greenhouse effect is solved. The process and the apparatus of the present invention are an active process for solving the $CO_2$ problem.

SUMMARY OF THE INVENTION

The present invention is directed to a method and an apparatus for energy conversion cycle based on SOFC and utilizing $CO_2$ source. Main cause of greenhouse effect, waste $CO_2$ $(g)$ is adopted as cathode oxidant of an SOFC and is cracked into $CO_{(g)}$ and $\frac{1}{2}O_2$, and the generated $O_2$ receives electrons and is conducted from a cathode to an anode through an electrolyte and electrochemically reacts in the SOFC with an anode fuel such as $H_2$, $CH_4$, alkanes, and hydrocarbons for power generation and thus depleted, which may effectively promote the conversion of waste $CO_2$ into CO, such that $CO_2$ is further fixed in a useful solid or liquid compound. In the present invention, in a general chemical reaction (in the presence of a catalyst), $CO_2 \rightarrow CO_{(g)}+\frac{1}{2}O_2$ cannot be carried out because the feasible or spontaneous reaction temperature is 3001.5° C. or above according to thermodynamic calculation. However, in the process and the apparatus of $CO_2$ energy source adopted in SOFC-$CO_2$-ECC of the present invention, the spontaneous reaction may be carried out at about 800° C. via simultaneously catalytic and electrochemical reactions in the SOFC. This just meets a current medium-to-high operating temperature in an SOFC of 700-1000° C. In this way, a problem that $CO_2$ cannot be converted due to extreme stability is solved, and $CO_2$ is converted into $CO_{(g)}$ which is easy to handle and may be used as anode fuel of the SOFC and react with $O_2$ in cathode air for power generation. Furthermore, general chemical reactions with other compounds containing carbon, hydrogen, or oxygen may be carried out with $CO_{(g)}$ as raw material, to prepare a derived solid or liquid compound, for example, alcohols such as $CH_3OH$, acids, or aldehydes, and other reaction products, for being stored or recycled in various products and industries.

In an embodiment, the present invention provides a process of $CO_2$ energy source adopted in SOFC-$CO_2$-ECC, which includes:

providing an apparatus for energy conversion cycle based on Solid Oxide Fuel Cell and utilizing CO2 source;

introducing hydrogen to an anode of a first SOFC, and introducing $CO_2$ to a cathode of the first SOFC, such that catalytic and electrochemical reactions occur in the first SOFC, to generate CO and $H_2O$;

introducing air to a cathode of a second SOFC, and introducing CO generated at the cathode of the first SOFC to an anode of the second SOFC, such that catalytic and electrochemical reactions occur in the second SOFC, to generate CO2; and feeding $CO_2$ generated at the anode of the second SOFC back into the cathode of the first SOFC.

In another embodiment, the present invention provides an apparatus of $CO_2$ energy source adopted in SOFC-$CO_2$ ECC, which includes a first SOFC and a second SOFC.

In the first SOFC, hydrogen is introduced to an anode, and $CO_2$ is introduced to a cathode, $CO_2$ is finally cracked into CO and $H_2O$, main chemical reactions at the anode includes $H_2(g) \rightarrow H_2$ (anode)$\rightarrow 2H^+$ (anode)$+2e-$ and $2H^+$ (anode)$+O^{2-}$ (anode)$\rightarrow H_2O(g)$, or an overall chemical reaction at the anode is $H_2(g)+O^{2-}$ (anode)$\rightarrow H_2O(g)+2e-$; main chemical reactions at the cathode include $CO_2(g) \rightarrow CO_2$ (cathode)$\rightarrow$CO (cathode)$+\frac{1}{2}O_2$ (cathode), CO (cathode)$\rightarrow$CO(g) and $\frac{1}{2}O_2$ (cathode)$+2e- \rightarrow O^{2-}$ (cathode); a main chemical reaction in an electrolyte is oxygen ion conduction: $O^{2-}$ (cathode)$\rightarrow O^{2-}$ (anode); and an overall chemical reaction in the first SOFC is $H_2(g)+CO_2(g) \rightarrow H_2O(g)+CO(g)$.

The second SOFC is connected in series to the first SOFC, in which CO generated after $CO_2$ is cracked in the first SOFC is introduced to an anode of the second SOFC and air is introduced to an cathode for power generation, and $CO_2$ generated after power generation in the second SOFC is further introduced to the cathode of the first SOFC, main chemical reactions at the anode include $CO(g) \rightarrow CO$ (anode) and $O^{2-}$ (anode)$+CO$ (anode)$\rightarrow CO_2$ (anode)$+2e-$; a main chemical reaction at the cathode includes $\frac{1}{2}O_2(g) \rightarrow \frac{1}{2}O_2$(cathode)$+2e- \rightarrow O^{2-}$ (cathode); a main chemical reaction in an electrolyte is oxygen ion conduction: $O^{2-}$ (cathode)$\rightarrow O^{2-}$ (anode); and an overall chemical reaction in the second SOFC 11 is $CO(g)+\frac{1}{2}O_2(g) \rightarrow CO_2(g)$.

BRIEF DESCRIPTION OF THE DRAWINGS

The present invention will become more fully understood from the detailed description given herein below for illustration only, and thus are not limitative of the present invention, and wherein:

FIG. 3 is a flow chart of an experiment of an effect of a first SOFC;

DETAILED DESCRIPTION OF THE INVENTION

The technical means for achieving the objectives of the present invention and effects thereof are described below with reference to accompanying drawings; however, the embodiments recited in the drawings below are provided for illustration and for the Examiner to understand the present invention, and the technical means of the present invention is not limited to the recited drawings.

Figure 1A:
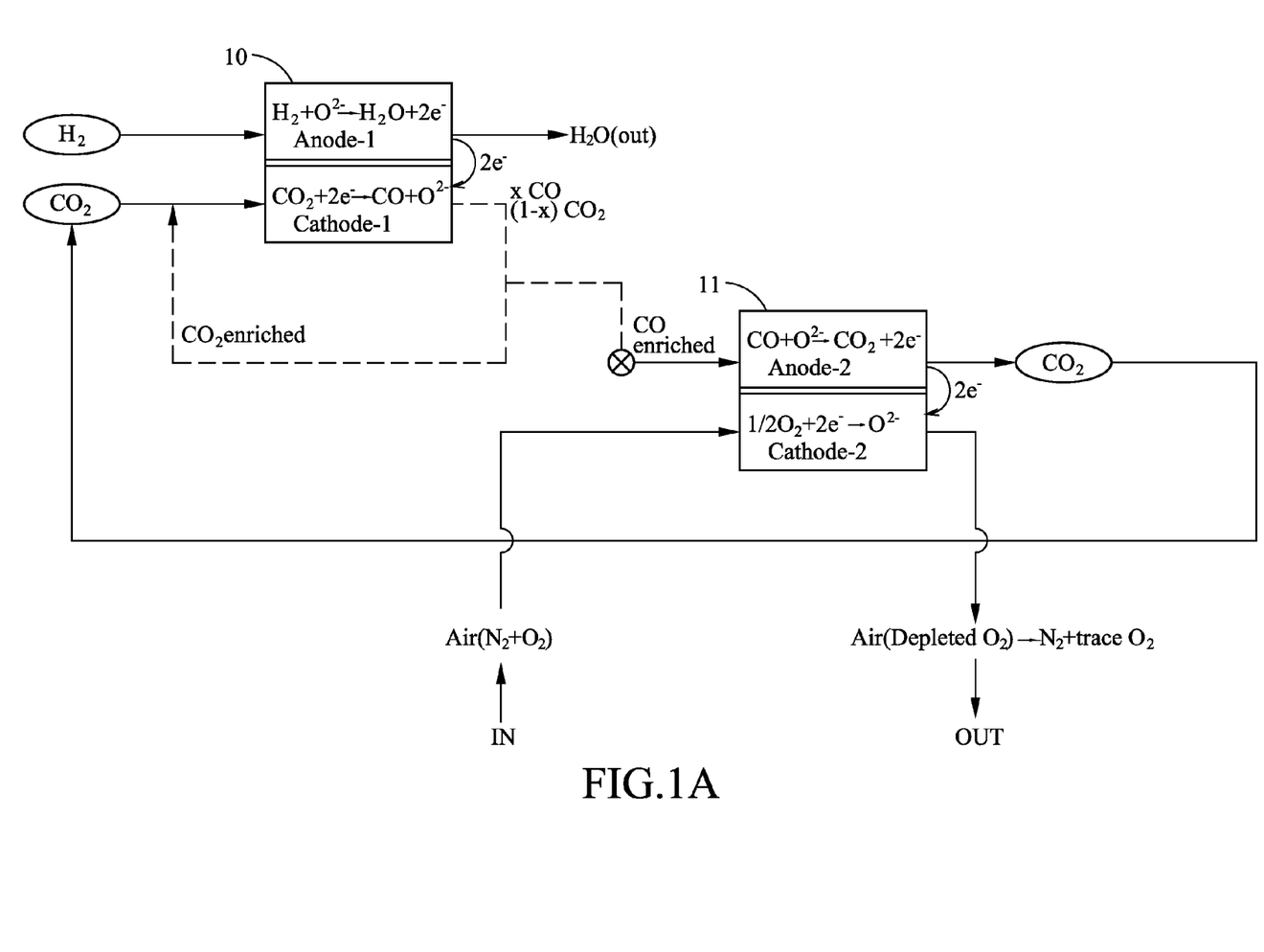
FIG. 1A is a schematic view of an apparatus for energy conversion cycle based on Solid Oxide Fuel Cell and utilizing $CO_2$ source.

FIG. 1A is a schematic view of an apparatus for energy conversion cycle based on Solid Oxide Fuel Cell and utilizing $CO_2$ source, which includes a first SOFC 10 and a second SOFC 11.

In the first SOFC 10, hydrogen is introduced to an anode, and $CO_2$ is introduced to a cathode, $CO_2$ is finally cracked into CO and $H_2O$, in which main chemical reactions at the anode include $H_2(g) \to H_2$ (anode)$\to 2H^+$ (anode)+2e− and $2H^+$ (anode)+$O^{2-}$ (anode)$\to H_2O(g)$, or an overall chemical reaction at the anode is $H_2(g)+O^{2-}$ (anode)$\to H_2O(g)$+2e−; main chemical reactions at the cathode include $CO_2(g) \to CO_2$ (cathode)$\to$ CO (cathode)+½$O_2$ (cathode), CO (cathode)$\to$ CO(g) and ½$O_2$ (cathode)+2e−$\to O^{2-}$ (cathode); a main chemical reaction in an electrolyte is oxygen ion conduction: $O^{2-}$ (cathode)$\to O^{2-}$ (anode); and an overall chemical reaction in the first SOFC 10 is $H_2(g)+CO_2(g) \to H_2O(g)+CO(g)$.

The second SOFC 11 is connected in series to the first SOFC, in which CO generated after $CO_2$ is cracked in the first SOFC 10 is introduced to an anode of the second SOFC 11 and air is introduced to an cathode for power generation, and $CO_2$ generated after power generation in the second SOFC 11 is further fed to the cathode of the first SOFC 10, main chemical reactions at the anode include $CO(g) \to CO$ (anode) and $O^{2-}$ (anode)+CO (anode)$\to CO_2$ (anode)+2e−, in which in order to eliminate the damage on the cell caused by carbon deposition on the anode, a suitable quantity of $H_2$, gaseous $H_2O$, or a mixture thereof may be co-fed with CO, to improve the material and structure of the anode at the same time, that is, to solve carbon deposition problem of Doudouard reaction; a main chemical reaction at the cathode includes ½$O_2$ (g)$\to$½$O_2$(cathode)+2e−$\to O^{2-}$ (cathode); a main chemical reaction in an electrolyte is oxygen ion conduction: $O^{2-}$ (cathode)$\to O^{2-}$ (anode); and an overall chemical reaction in the second SOFC 11 is $CO(g)+½O_2(g) \to CO_2(g)$.

Figure 1B:
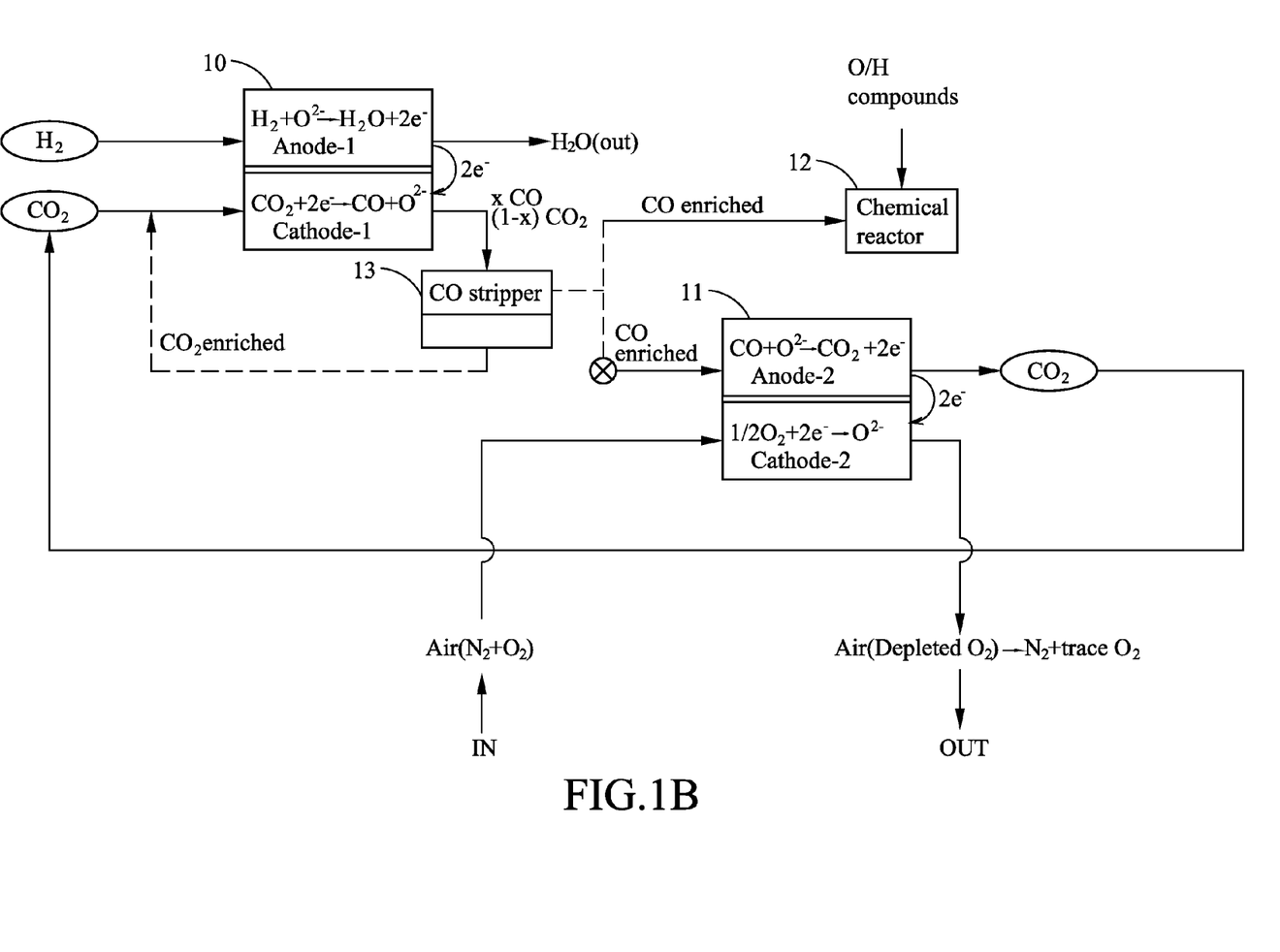
FIG. 1B is a schematic view of an apparatus for energy conversion cycle based on Solid Oxide Fuel Cell and utilizing $CO_2$ source including a CO stripper.

As shown in FIG. 1B, the apparatus for energy conversion cycle based on Solid Oxide Fuel Cell and utilizing $CO_2$ source may further include a CO stripper 13 for separating CO from $CO_2$ to improve the concentration of CO, which has one end connected to a vent of the cathode of the first SOFC 10, and an other end split into three pipelines connected to the anode of the second SOFC 11, a gas inlet of the cathode of the first SOFC 10, and a chemical reactor 12 respectively, and one of the three pipelines is selected for transporting the gas according to the concentration of CO after treatment, for example, high concentration of stripped CO is fed into the chemical reactor 12, to react with hydrogen, oxygen, or a mixture thereof, so as to convert CO into a liquid or solid compound for storage. Or, CO is fed into the anode of the second SOFC 11 for power generation.

The first SOFC 10 may be a tubular type or a planar type, the first SOFC is an anode support cell (ASC) type, an electrolyte support cell (ESC) type, or a metal support cell (MSC) type, the structure of the first SOFC is a type of NiO-YSZ/YSZ/LSM-GDC+LSM, in which NiO-YSZ is the anode, YSZ is the electrolyte layer, and LSM-GDC+LSM is the composite cathode, but the present is not limited to the above types and materials.

The second SOFC 11 may be a tubular type or a planar type, and further, the second SOFC is an ASC type, an ESC type, or an MSC type, the structure of the second SOFC is a type of NiO-YSZ/YSZ/LSM-GDC+LSM, in which NiO-YSZ is the anode, YSZ is the electrolyte layer, LSM-GDC+LSM is the composite cathode, and further, the anode is treated with $CeO_2$—Cu, but the present is not limited to the above types and materials, and the anode may be treated with $CeO_2$—Cu, to combat carbon deposition.

The reaction temperature in the first SOFC 10 is about 700-1000° C., the electrolyte is preferably YSZ or ScSZ, a catalyst having a high catalytic activity such as platinum (Pt) or a noble metal may be doped in the cathode to improve the conversion yield.

The reaction temperature in the second SOFC is about 600-1000° C.

Figure 2:
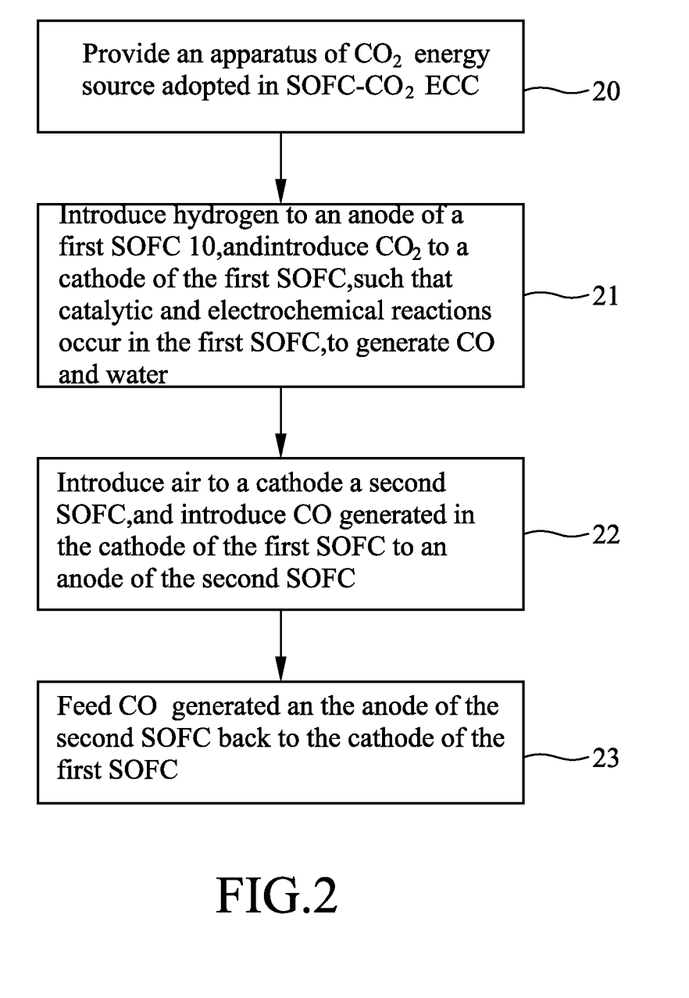
FIG. 2 is a flow chart of a method for energy conversion cycle based on Solid Oxide Fuel Cell and utilizing $CO_2$ source.

FIG. 2 is a flow chart of a method for energy conversion cycle based on Solid Oxide Fuel Cell and utilizing $CO_2$ source, and the method includes the following steps.

Step 20 is performed firstly, in which an apparatus for energy conversion cycle based on Solid Oxide Fuel Cell and utilizing $CO_2$ source is provided.

Then, Step 21 is performed, in which hydrogen is introduced to the anode of the first SOFC 10, and $CO_2$ is introduced to the cathode of the first SOFC 10, such that catalytic and electrochemical reactions occur in the first SOFC 10, to generate CO and $H_2O$.

Next, Step 22 is performed, in which air is introduced to the cathode of the second SOFC 11, and CO generated at the cathode of the first SOFC 10 is introduced to the anode of the second SOFC 11, in which in order to avoid the problem of carbon deposition, a suitable quantity of $H_2$, gaseous $H_2O$, or a mixture thereof may be added when CO is introduced to the anode of the second SOFC 11.

Finally, Step 23 is performed, in which $CO_2$ generated at the anode of the second SOFC 11 is fed back into the cathode of the first SOFC 10.

After Step 21, a step of separating CO from $CO_2$ to improve the concentration of CO and introducing the high concentration of CO into the chemical reactor 12 for reacting with hydrogen, or oxygen, or a mixture thereof to convert CO into a liquid or solid compound for storage is further included.

FIG. 3 is a flow chart of an experiment of an effect of the first SOFC. In this experiment, an ASC is used, the cell has a structure of an anode of NiO/8YSZ, an electrolyte of YSZ, and a cathode of LSM+GDC/LSM, and the experiment includes the following steps.

Figure 4:
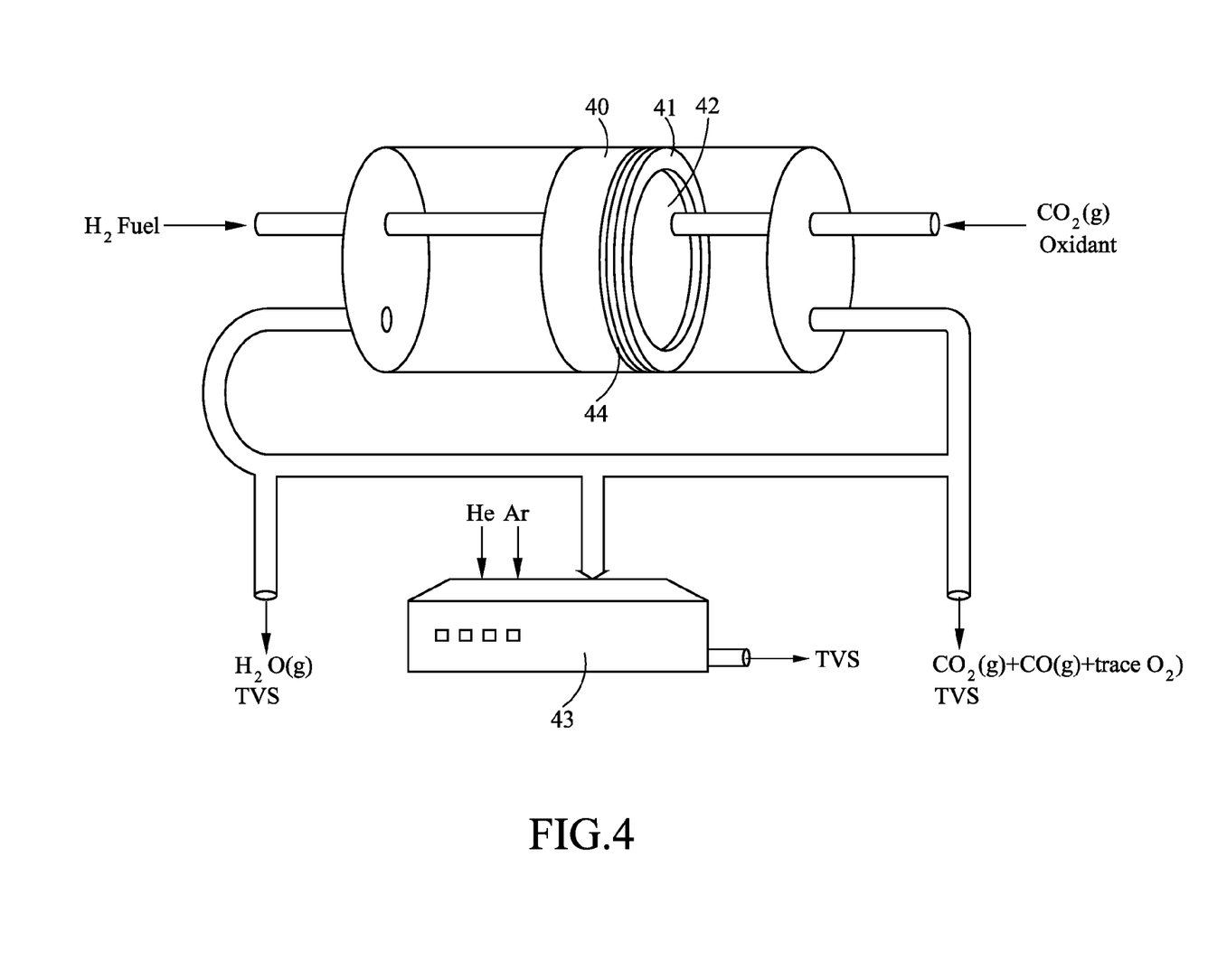
FIG. 4 is a schematic view of compartment of a cathode chamber and an anode reaction chamber of a SOFC-MEA.

Step 30 is performed firstly, in which an SOFC-Membrane Electrode Assembly (MEA) is set at a cell test station (for example, ProboStat Unit) and platinum wires are respectively attached to a cathode and an anode of the MEA. A golden ring is melted at about 1053° C. and seals a cathode of MEA or cell and an alumina tube end of the cell test station, to isolate a cathode reaction chamber and a anode reaction chamber to an gas tight grade. The schematic structural view of the apparatus and the cell chambers is as shown in FIG. 4. The platinum wires of the cathode and the anode are respectively attached to, for example, a ProboStat-[solartron-SI-1287 (Electrochemical Interface)/1267 (Impedance/Gain-Phase Analyzer]

system, for cell performance data collection, including potential/current/power density (V-I-P) vs. time relation and temperature-related data recording.

Then, Step 31 is performed, in which the cell test station is set in a high-temperature oven, and heated (for example, ProboStat) to 1053° C. at a temperature raising rate of 1° C./min (generally lower than 3° C./min), while $N_2$ is introduced to the anode to serve as a leakage testing gas when the cathode reaction chamber and the anode reaction chambers are sealed with the golden ring, till it is confirmed that the reaction chambers at the cathode end and the anode end of the MEA are isolated, and no transfer and leakage of gas occur.

Figure 5:
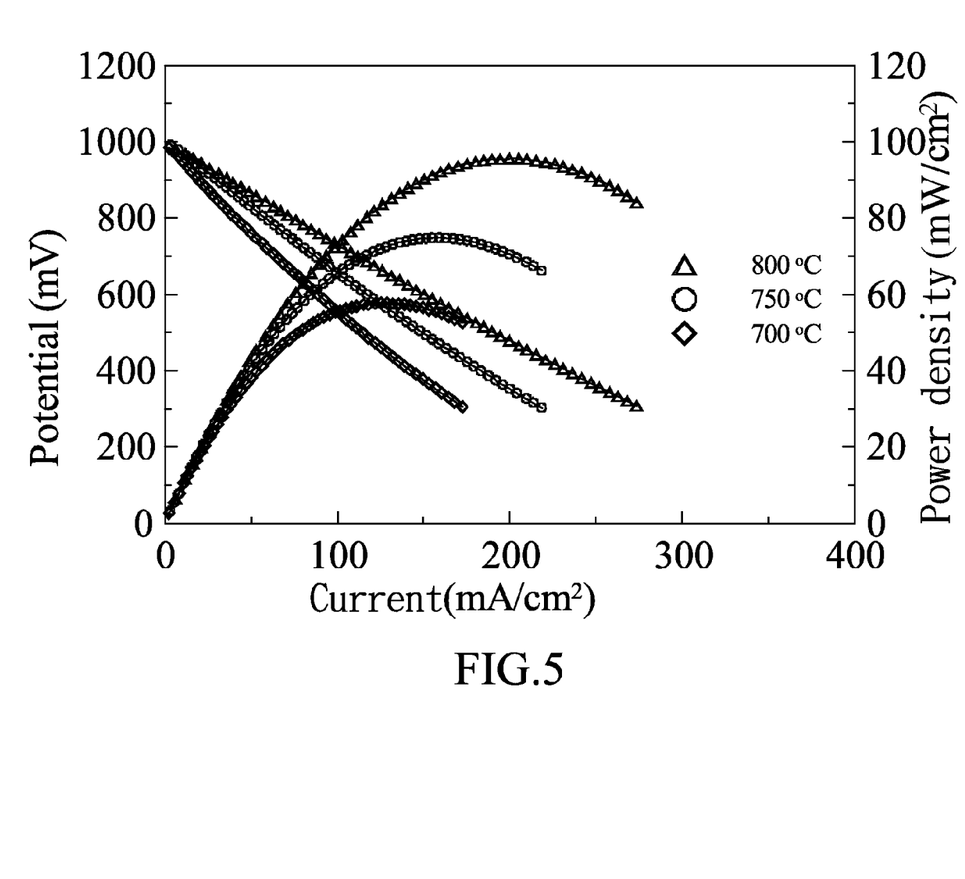
FIG. 5 is an electrical test diagram of a first SOFC with hydrogen and air respectively at an anode and a cathode.
Figure 6:
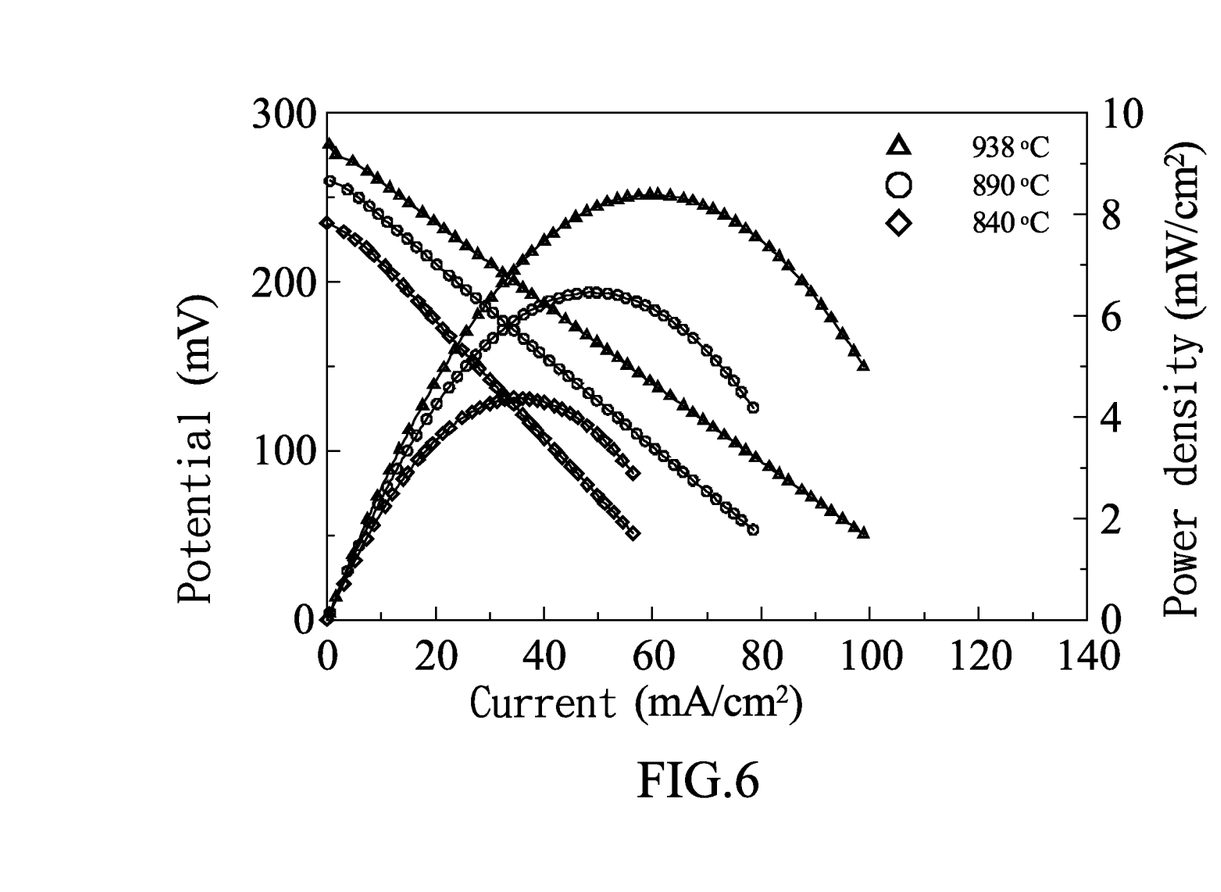
FIG. 6 is an electrical test diagram of a first SOFC with hydrogen and $CO_2$ respectively at an anode and a cathode.

Next, Step 32 is performed, in which $H_2$ is introduced to the anode to reduce anode NiO to Ni, and air is introduced to the cathode at the same time. It is tested whether an open circuit voltage (OCV) reaches 1.0V or above (at 800° C.), to confirm whether the structure of the MEA (cell) is qualified. Moreover, the V-I-P and the electrical impedance spectrum (EIS) of the test cell are persistently recorded, to confirm the magnitude of electricity, so as to determine whether the cell and the wires are in good contact. Therefore, at an earlier stage of performance test of the MEA, $H_2$ (anode)/air (cathode) are used as system gas, to verify whether the cell and the system is in good state. The test results are as shown in FIG. 5.

Subsequently, Step 33 is performed, in which the gas introduced to the anode is kept unchanged, the gas introduced to the cathode is $CO_2$ instead, and the OCV and the V-I-P, and composition and concentration of reaction products ($CO_2/CO/O_2$) at the cathode are tested and recorded respectively at 840° C., 890° C. and 938° C. It is confirmed that $CO_2$ may be used as cathode oxidant gas of the first SOFC, suggesting that $CO_2(g) \rightarrow CO(g) + \frac{1}{2}O_2(g)$ is feasible to be performed at the cathode, and $O_2$ may be successfully provided in progression of electrochemical reaction and be used for current generation. Experimental results are as shown in FIGS. 6, 7A, 7B, 7C, 7D, 8 and 9, and the correctness of the system and the feasibility of SOFC-$CO_2$-ECC are confirmed. CO concentration may be up to 27.83 mol % (that is, conversion of $CO_2$=0.2783), and $O_2$ concentration is 0% in one reaction pass, indicating that $O_2$ generated in cracking of $CO_2$ is completely depleted at the cathode.

Afterwards, Step 34 is performed, in which after the cell performance test is completed, the gas flow rate is lowered, the anode is maintained in a reduction atmosphere, and cooled to room temperature at a temperature drop rate of 1° C./min (generally lower than 3° C./min), and then the fed gases are completely closed. Thus, the main test of the system is completed.

Finally, Step 35 is performed, in which the cell performance data is analyzed to identify the feasible achievement of the SOFC-$CO_2$-ECC. It is verified through this test result that the present invention is capable of effectively treating the main cause of the greenhouse gas $CO_2$ by cycling $CO_2$ for use in the second SOFC for power generation on one hand, and by cracking $CO_2$ into CO having high activity on other hand, which can react with other substance such as hydrogen or oxygen to generate a useful solid or liquid compound, such that $CO_2$ in the atmosphere is converted into a solid or liquid compound, thereby achieving the purpose of energy saving and carbon reduction, so as to eliminate $CO_2$ greenhouse gas.

Figure 7A:
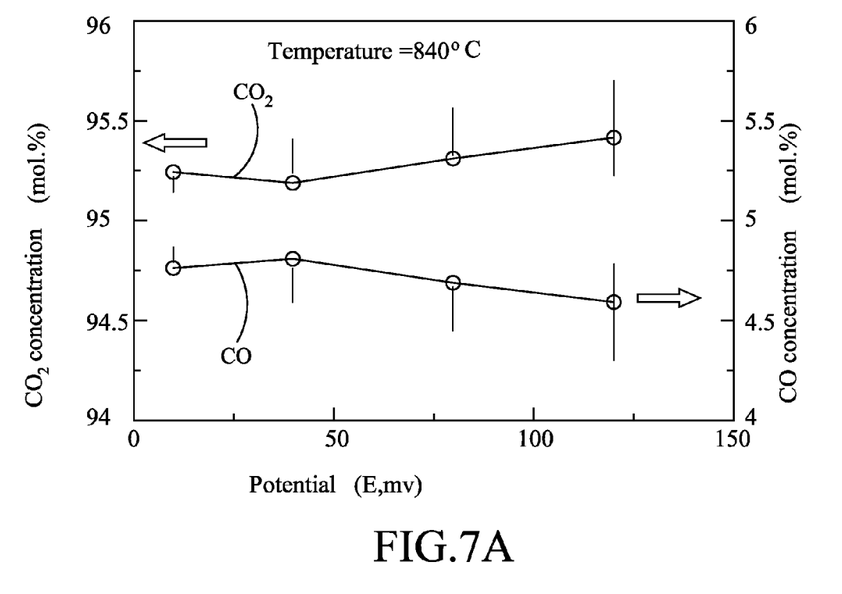
FIG. 7A-7D are a result diagram of $CO_2$ conversion yield tested with a test system at different operation temperatures with $H_2/N_2$ and $CO_2$ at an anode and a cathode respectively.
Figure 7B:
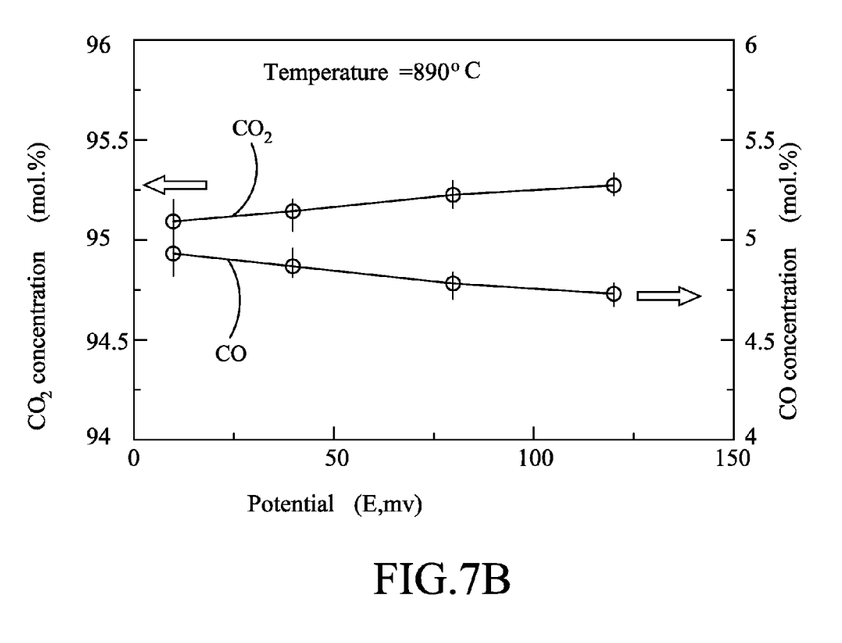
Figure 7C:
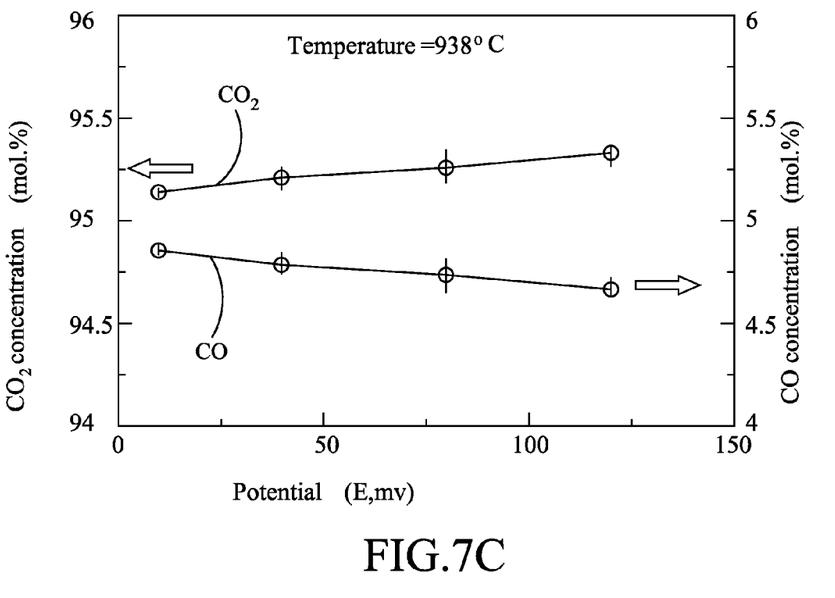
Figure 7D:
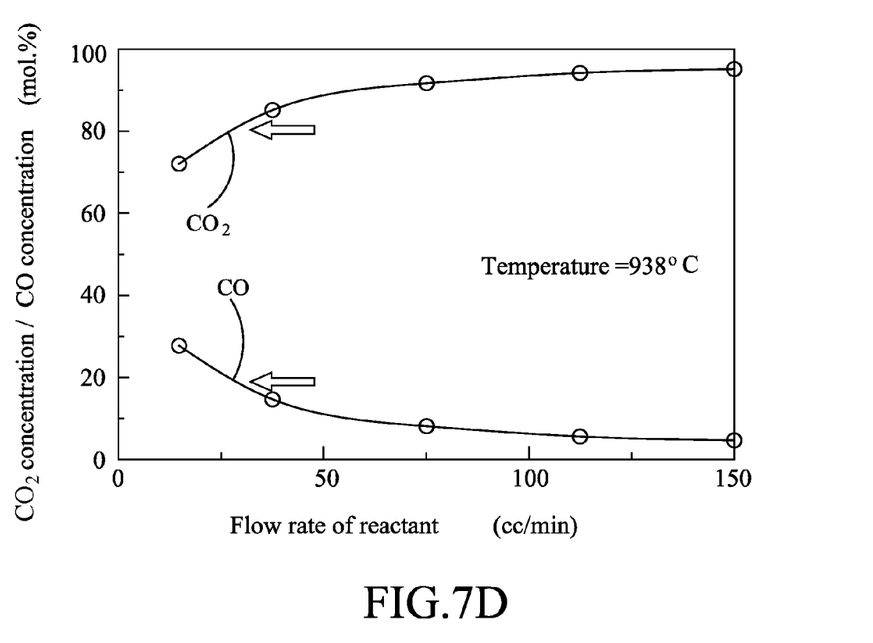
Figure 8:
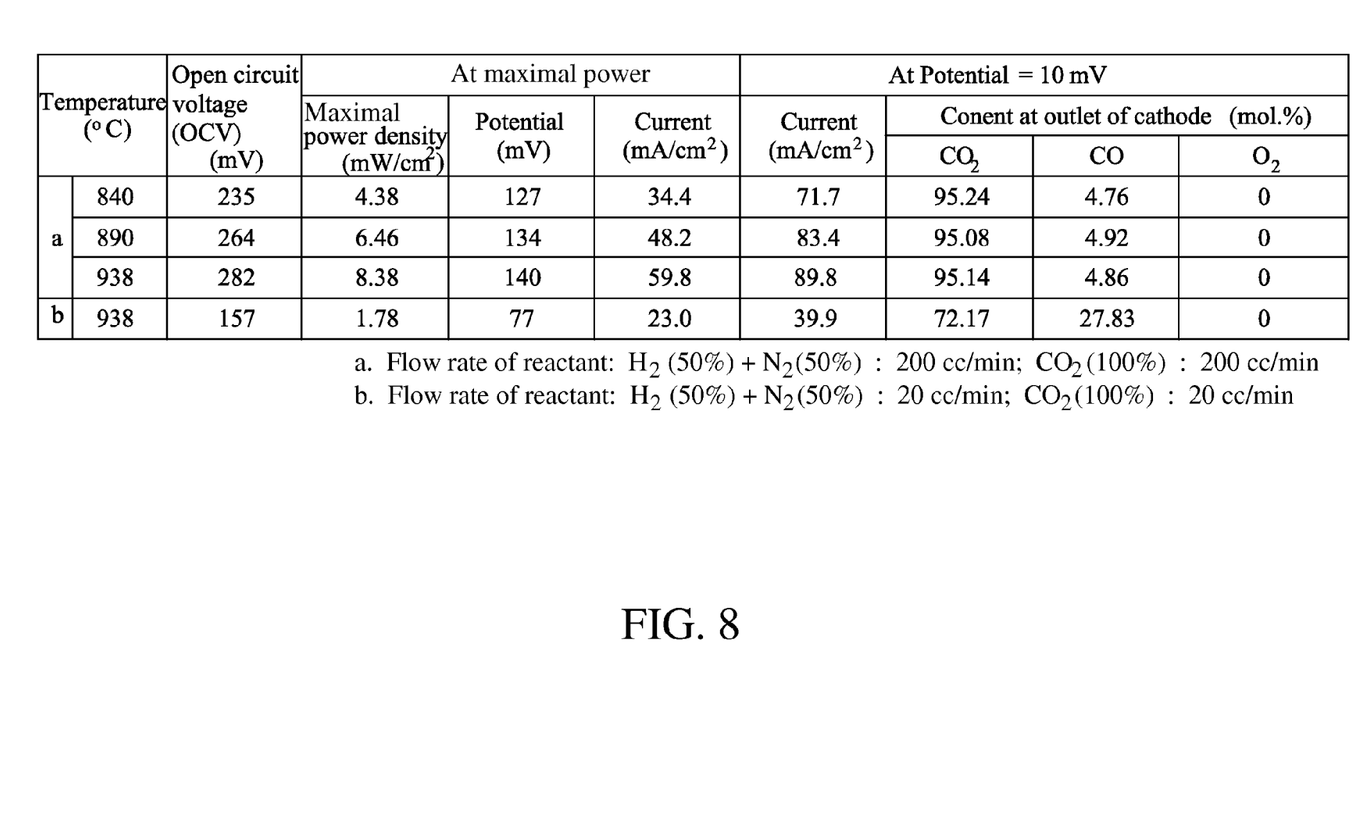
FIG. 8 shows test data of a first solid oxide fuel cell.
Figure 9:
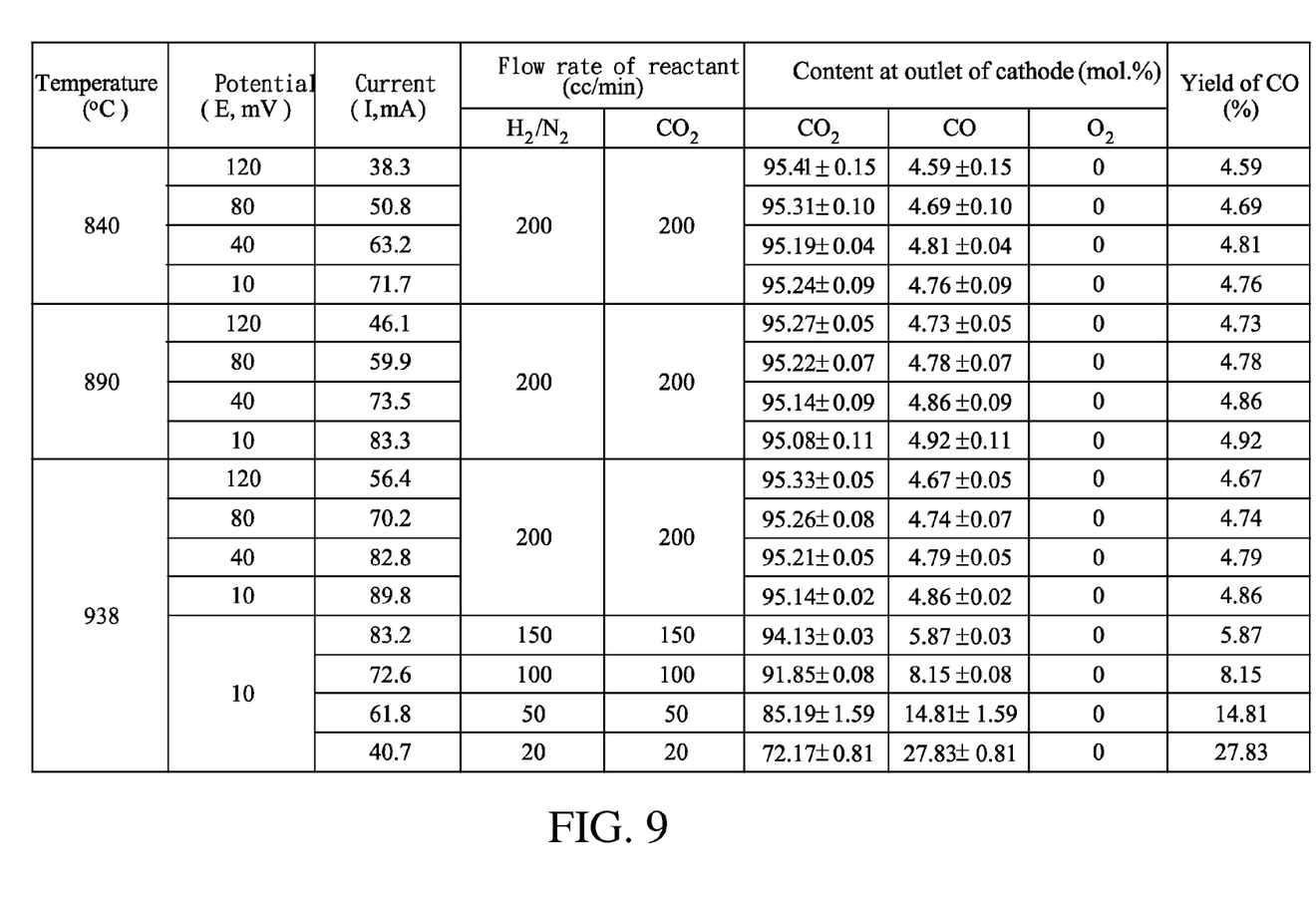
FIG. 9 shows results of $CO_2$ conversion yield.

FIGS. 7A, 7B, 7C, and 7D are result diagrams of $CO_2$ conversion yield tested with a test system respectively at an anode and a cathode with $H_2$, $N_2$ and $CO_2$ at different operation temperatures, and test result diagrams of concentrations of reactant $CO_2$ and product CO vs operation potential at different operation temperatures, in which temperatures in FIGS. 7A, 7B, and 7C are respectively 840° C., 890° C. and 938° C.; and FIG. 7D is a test result diagram of concentrations of reactant $CO_2$ and product CO vs flow rate of reactants at an operation temperature of 938° C.

Although the preferred embodiments of the present invention are described in detail above, they are not intended to limit the scope of the present invention. Any equivalent variations or modifications made without departing from the spirit of the present invention shall fall within the scope of the present invention.

What is claimed is:

1. An apparatus, comprising:
a first Solid Oxide Fuel Cell (SOFC) having a first anode and a first cathode, wherein hydrogen is introduced to the first anode, $CO_2$ is introduced to the first cathode, $CO_2$ is finally cracked into CO and $H_2O$, main chemical reactions at the first anode comprises: $H_2(g) \rightarrow H_2$ (the first anode)$\rightarrow 2H^+$ (the first anode)$+2e-$ and $2H^+$ (the first anode)$+O^{2-}$ (the first anode)$\rightarrow H_2O$ (g), or an overall chemical reaction at the first anode is $H_2(g)+O^{2-}$ (the first anode)$\rightarrow H_2O$ (g)$+2e-$; main chemical reactions at the first cathode comprises $CO_2(g) \rightarrow CO_2$ (the first cathode)$\rightarrow CO$ (the first cathode)$+\frac{1}{2}O_2$ (the first cathode), CO (the first cathode)$\rightarrow CO$ (g) and $\frac{1}{2}O_2$ (the first cathode)$+2e- \rightarrow O^{2-}$ (the first cathode); a main chemical reaction in an electrolyte of the first SOFC is oxygen ion conduction: $O^{2-}$ (the first cathode)$\rightarrow O^{2-}$ (the first anode); and an overall chemical reaction in the first SOFC is $H_2(g)+CO_2(g) \rightarrow H_2O$ (g)$+CO(g)$; and
a second SOFC having a second anode and a second cathode, connected in series to the first SOFC, wherein CO generated after $CO_2$ is cracked in the first SOFC is introduced to the second anode, air is introduced to the second cathode, $CO_2$ generated after power generation in the second SOFC is introduced into the first cathode, main chemical reactions at the second anode comprise CO (g)$\rightarrow CO$ (the second anode) and $O^{2-}$ (the second anode)$+CO$ (the second anode)$\rightarrow CO_2$ (the second anode)$+2e-$; a main chemical reaction at the second cathode is $\frac{1}{2}O_2(g) \rightarrow \frac{1}{2}O_2$ (the second cathode)$+2e- \rightarrow O^{2-}$ (the second cathode); a main chemical reaction in an electrolyte of the second SOFC is oxygen ion conduction: $O^{2-}$ (the second cathode)$\rightarrow O^{2-}$ (the second anode); and an overall chemical reaction in the second SOFC is CO (g)$+\frac{1}{2}O_2(g) \rightarrow CO_2$ (g).

2. The apparatus of claim 1, further comprising a CO stripper for separating CO from $CO_2$, having one end connected to a vent of the first cathode, and an other end split into three pipelines connected to the second anode, a gas inlet of the first cathode, and a chemical reactor respectively, wherein in the chemical reactor, the introduced CO reacts with hydrogen, oxygen, or a mixture thereof, to generate a liquid or solid compound.

3. The apparatus of claim 2, wherein the first SOFC is a tubular type or a planar type, further the first SOFC is an anode support cell (ASC) type, an electrolyte support cell (ESC) type, or a metal support cell (MSC) type, and a structure of the first SOFC is a type of NiO-YSZ/YSZ/LSM-GDC+LSM, in which NiO-YSZ is an anode, YSZ is an electrolyte, and LSM-GDC+LSM is a composite cathode.

4. The apparatus of claim 2, wherein the second SOFC is a tubular type or a planar type, further the second SOFC is an anode support cell (ASC) type, an electrolyte support cell (ESC) type, or a metal support cell (MSC) type, a structure of the second SOFC is a type of NiO-YSZ/YSZ/LSM-GDC+LSM, in which NiO-YSZ is an anode, YSZ is an electrolyte, LSM-GDC+LSM is a composite cathode, and the anode is treated with $CeO_2$—Cu.

5. The apparatus of claim 2, wherein a reaction temperature in the first SOFC is about 700-1000° C.

6. The apparatus of claim 2, wherein a reaction temperature in the second SOFC is about 600-1000° C.

7. The apparatus of claim 2, wherein a noble metal is added in the first SOFC as catalyst.

8. The apparatus of claim 7, wherein the noble metal is platinum.

9. A method, comprising:
   providing an apparatus having a first Solid Oxide Fuel Cell (SOFC) and a second SOFC, wherein the first SOFC has a first anode and a first cathode, and the second SOFC has a second anode and a second cathode;
   introducing hydrogen to the first anode, and introducing $CO_2$ to the first cathode, such that catalytic and electrochemical reactions occur in the first SOFC, to generate CO and $H_2O$;
   introducing air to the second cathode, and introducing CO generated at the first cathode to the second anode, such that catalytic and electrochemical reaction occur in the second SOFC, to generate $CO_2$; and
   feeding $CO_2$ generated at the second anode back into the first cathode.

10. The method of claim 9, further comprising separating CO from $CO_2$, to improve a concentration of CO, and feeding the concentrated CO into a chemical reactor, to react with hydrogen, oxygen, or a mixture thereof, so as to convert CO into a liquid or solid compound for storage.

11. The method of claim 9, wherein $H_2$, gaseous $H_2O$, or a mixture thereof is added when CO generated at the first cathode is introduced to the second anode.

\* \* \* \* \*